United States Patent
Stevens et al.

(10) Patent No.: US 9,105,299 B2
(45) Date of Patent: Aug. 11, 2015

(54) MEDIA DATA ENCODING APPARATUS AND METHOD

(75) Inventors: Timothy S Stevens, Woodbridge (GB); Joshan Meenowa, Ipswich (GB); Dale Robertson, Ipswich (GB); Ian C Kegel, Woodbridge (GB); Ivan Roper, Felixstowe (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 579 days.

(21) Appl. No.: 12/935,836

(22) PCT Filed: Mar. 20, 2009

(86) PCT No.: PCT/GB2009/000753
§ 371 (c)(1),
(2), (4) Date: Sep. 30, 2010

(87) PCT Pub. No.: WO2009/122129
PCT Pub. Date: Oct. 8, 2009

(65) Prior Publication Data
US 2011/0026610 A1    Feb. 3, 2011

(30) Foreign Application Priority Data
Mar. 20, 2009 (EP) .................................. 08251238

(51) Int. Cl.
*H04N 7/12* (2006.01)
*G11B 27/034* (2006.01)
(Continued)

(52) U.S. Cl.
CPC ............ *G11B 27/034* (2013.01); *G11B 27/28* (2013.01); *G11B 27/322* (2013.01); *H04N 19/107* (2014.11); *H04N 19/142* (2014.11); *H04N 19/179* (2014.11); *H04N 19/192* (2014.11)

(58) Field of Classification Search
CPC .... G11B 27/034; G11B 27/28; G11B 27/322; H04N 19/107; H04N 19/142; H04N 19/179; H04N 19/192
See application file for complete search history.

(56) References Cited

U.S. PATENT DOCUMENTS 5,903,673 A * 5/1999 Wang et al. .................... 382/236
6,154,771 A * 11/2000 Rangan et al. ................. 709/217
(Continued)

FOREIGN PATENT DOCUMENTS

EP    1630744    3/2006

OTHER PUBLICATIONS

International Search Report for PCT/GB2009/000753, mailed Jun. 17, 2009.
(Continued)

*Primary Examiner* — Sath V Perungavoor
*Assistant Examiner* — Jill Sechser
(74) *Attorney, Agent, or Firm* — Nixon & Vanderhye P.C.

(57) ABSTRACT

A method and apparatus for encoding media content. In the field of video compression, temporal compression generates I-frames and dependent P-frames and B-frames. The placement of I-frames is determined by the presence of scene switches in the video. In order to improve the ability of a user to seek to interesting parts of the video, a video encoder considers semantic data identifying narrative points of interest within the video. The encoding process generates encoded video data having I-frames present at scene transitions and also at narratively interesting parts of the video.

16 Claims, 8 Drawing Sheets

(51) Int. Cl.
*G11B 27/28* (2006.01)
*G11B 27/32* (2006.01)
*H04N 19/107* (2014.01)
*H04N 19/142* (2014.01)
*H04N 19/179* (2014.01)
*H04N 19/192* (2014.01)

(56) References Cited

U.S. PATENT DOCUMENTS

| | | | | |
|---|---|---|---|---|
| 6,462,754 | B1* | 10/2002 | Chakraborty et al. | 715/723 |
| 7,336,890 | B2* | 2/2008 | Lu et al. | 386/239 |
| 2003/0210821 | A1 | 11/2003 | Yogeshwar et al. | |
| 2005/0207442 | A1* | 9/2005 | Zoest et al. | 370/465 |
| 2006/0083299 | A1 | 4/2006 | Kitajima | |
| 2007/0025687 | A1* | 2/2007 | Kim | 386/68 |
| 2007/0081587 | A1* | 4/2007 | Raveendran et al. | 375/240.1 |
| 2007/0081588 | A1 | 4/2007 | Raveendran et al. | |
| 2007/0286279 | A1* | 12/2007 | Hamanaka | 375/240.12 |
| 2010/0067882 | A1* | 3/2010 | Axen et al. | 386/124 |

OTHER PUBLICATIONS

Javier, R. Hidalgo et al., "Metadata-based coding tools for hybrid video codecs" 23. Picture Coding Symposium, (Apr. 23, 2003).

* cited by examiner

| Created by: XX | | |
|---|---|---|
| For video file: YY | | |
| Frame number | Time index | Comment |
| 301 | 00:12:54 | Actor 2 enters scene |
| 659 | 00:27:46 | Actor 1 speaks |
| 757 | 00:31:54 | Actor 2 speaks |
| 981 | 00:41:28 | Start of music |
| 1664 | 01:09:33 | Still shot of object |
| 1812 | 01:15:50 | Actor 2 speaks |

MEDIA DATA ENCODING APPARATUS AND METHOD

This application is the U.S. national phase of International Application No. PCT/GB2009/000753 filed 20 Mar. 2009, which designated the U.S. and claims priority to EP Application No. 08251238.5 filed 31 Mar. 2008, the entire contents of each of which are hereby incorporated by reference.

TECHNICAL FIELD

The present invention relates to media encoding and in particular to an apparatus for and method of encoding video content making use of semantic data.

BACKGROUND

In recent years, digital media has become a commonplace carrier for delivering information to users. In particular, digital video allows users to obtain information through visual and audio means.

In its most basic form, digital video is composed of a sequence of complete image frames which are played back to the user at a rate of several frames per second. The quality of the video depends on the resolution of each frame, and also the rate at which frames are displayed. Higher resolution means that more detail can be included in each frame whilst higher frame rates improve the user's perception of movement in the video.

Increasing quality of video content results in larger file sizes which is undesirable in many applications. Encoding techniques, and in particular video compression techniques are known which aim to reduce file sizes while minimizing any loss in quality of the video. Video compression techniques generally fall into two groups: spatial compression and temporal compression, with many common video compression formats using a combination of both techniques.

Spatial compression involves applying compression to each individual image frame, for example in a manner similar to JPEG compression for still images.

Temporal compression exploits similarities in sequences of consecutive frames to reduce the information storage requirements. In many videos, significant parts of the scene do not change over time. In this case, the scene information from a previous scene can be re-used for rendering the next scene while only information relating to the changed pixels is stored. This can result in significant reductions in file size. Similarly, where the camera pans across a scene, a significant portion of the new frame is identical to the previous scene but offset in the direction of the pan. In this case only the newly viewable pixels would need to be encoded.

In a video compression such as MPEG-2, complete information frames are called Full Frames or I-frames (Independent frames). These frames are independent of other frames and can therefore be decoded without referring to any information in any other frames of the video. The main compression savings are made by converting the uncompressed video frames into dependent frames. These are frames which are dependent on some information from an adjacent frame in order to be successfully decoded. Dependent frames which are dependent on preceding frames are called Predictive Frames or P-Frames and frames which are dependent on both preceding and following frames are known as B-frames.

Whilst use of I-frames, P-frames and B-frames provides valuable file size savings, temporal compression techniques can inconvenience the user's viewing experience. For example, a user may wish to skip to a specific position in the file and begin playback from that position instead of watching the entire video in order.

If an I-frame is located in the video file at the user's selected position, then playback can begin from the selected position. However, if an I-frame is not present at the desired location, then in most cases, the video decoder will seek to the nearest I-frame location. The user must then wait for the desired segment of the video file to be played.

One known way to address the above problem is to insert more I-frames into the compressed video file. In addition to I-frames located at the scene switching points, I-frames are inserted at regular intervals, for example every second, or every 20 frames so that the granularity of the video segments is improved. However, the presence of more I-frames increases the file size of the video.

The present invention addresses the above problems.

BRIEF SUMMARY

In one aspect the present invention provides a method of encoding media content into a sequence of independent data frames and dependent data frames, the method comprising: analysing the media content to determine where scene changes occur within the media content; generating encoding parameters defining the location of said scene changes; accessing data indicating semantically significant sections of the media content; and updating the encoding parameters so that independent data frames are present at locations indicated by the semantic data.

In another aspect, the present invention provides an apparatus for encoding media content into a sequence of independent data frames and dependent data frames; the apparatus comprising: means for analysing the visual content of the media content; a configuration data store indicating the location of scene changes in the media content; accessing means for accessing data indicating semantically significant sections of the media content; means for updating the configuration data store to include full-frames at locations indicated by the semantic data.

In a further aspect, the present invention provides an encoded media file formed of a sequence of independent data frames and dependent data frames, the independent media frames being located at semantically significant parts of the media file.

Other preferable features are set out in the dependent claims.

BRIEF SUMMARY OF THE DRAWINGS

Embodiments of the present invention will now be described with reference to the accompanying figures in which.

DETAILED DESCRIPTION OF EXAMPLE EMBODIMENTS

In the first embodiment, the encoding system processes uncompressed video files to generate corresponding compressed video files having I-frames located at scene changes within the video and P-frames or B-frames for other frames as is conventional. Additionally, the encoder uses semantically significant data such as narrative information to add further I-frames at positions within the video which are not scene changes but are narratively significant.

Figure 1:
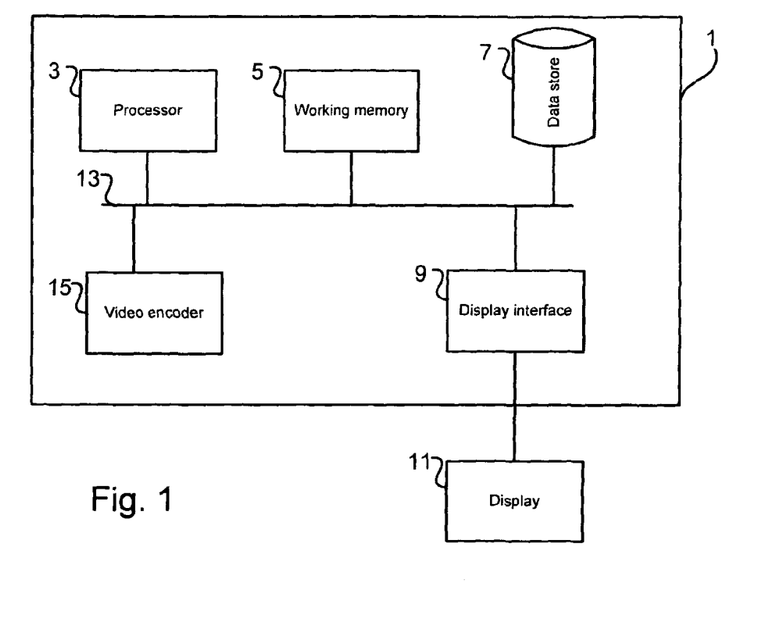
FIG. 1 shows the functional components in an encoding system according to a first embodiment.

FIG. 1 shows the main components in an encoding system 1 according to a first embodiment. The system comprises a central processor 3, working memory 5, a data store 7, a display interface 9 and a display 11, all connected via a common system bus 13. The system 1 also includes a dedicated video encoding processor 15 connected to the system bus.

Figure 2:
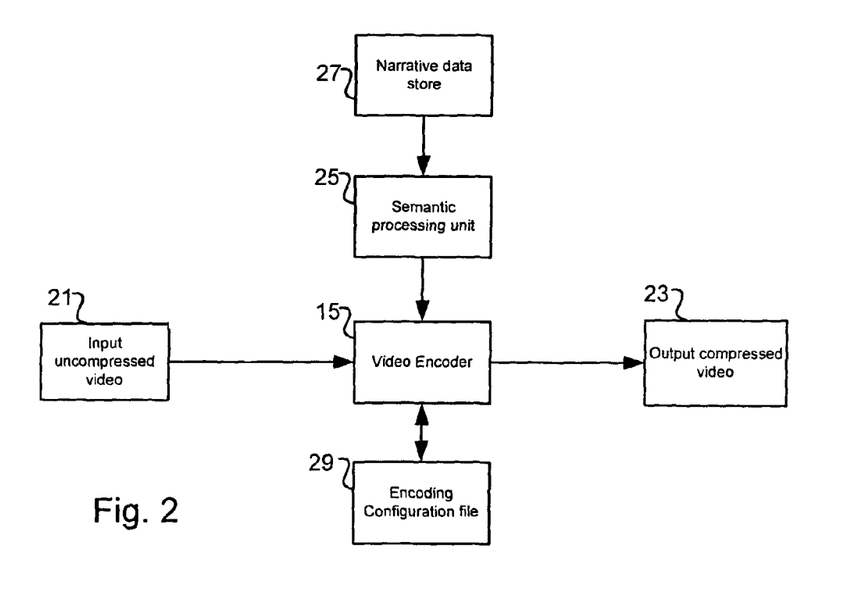
FIG. 2 shows the main functional units within the system illustrated in FIG. 1.

FIG. 2 shows the main functional units within the system illustrated in FIG. 1. The video encoder 15 receives an input video file 21 from the data store 7. The input video file is in a temporally uncompressed format such that each frame is fully independent of other frames. After encoding, the video encoder 15 stores an output encoded compressed video file 23 in the data store 7. The video encoder 15 also receives data from a semantically significant data processing unit 25 which is connected to a narration data file 27 which is also stored within the data store 7.

Figure 3:
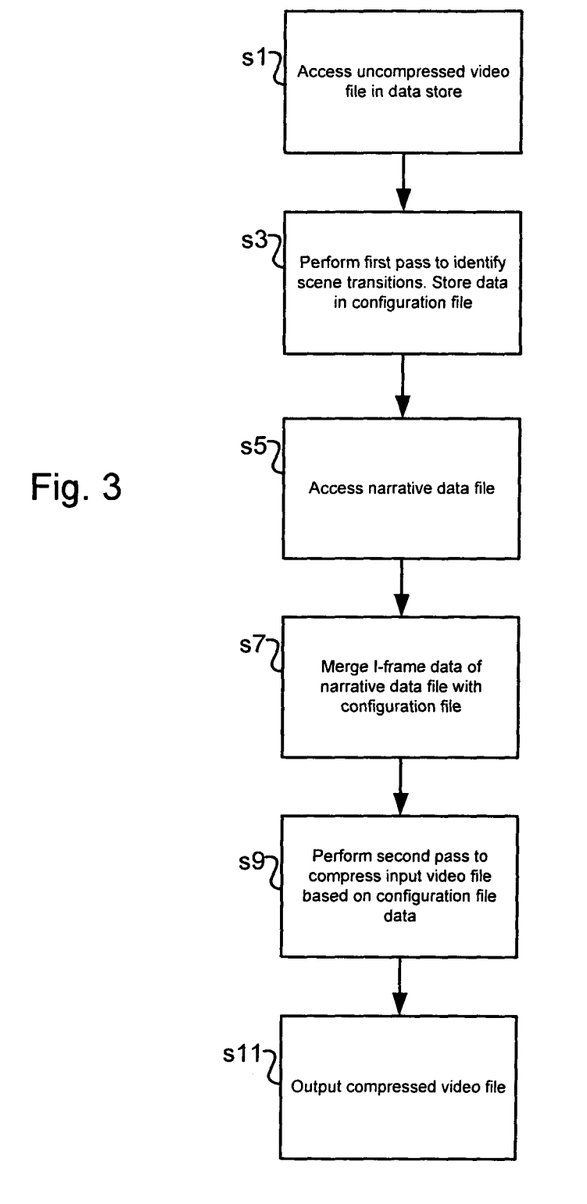
FIG. 3 shows a flow chart of the operation of the video encoder shown in FIG. 2.

FIG. 3 shows a flow chart of the operation of the video encoder shown in FIG. 2. In this embodiment the video encoder 17 uses a two-pass video encoding method to generate a compressed video file 23.

At step s1, the encoder 15 accesses the uncompressed video file 21. In step s3, the encoder 15 performs a first pass of the accessed video 21 to identify where scene changes occur. The locations of the scene changes within the video file 21 are stored in a configuration file 29 stored in the working memory 5. In this embodiment, the video encoder 15 stores the frame number of each frame where a scene change occurs. For example:

Frame 0;
Frame 56;
Frame 215;
Frame 394;
Frame 431;
Frame 457;
Frame 1499.

Figure 4:
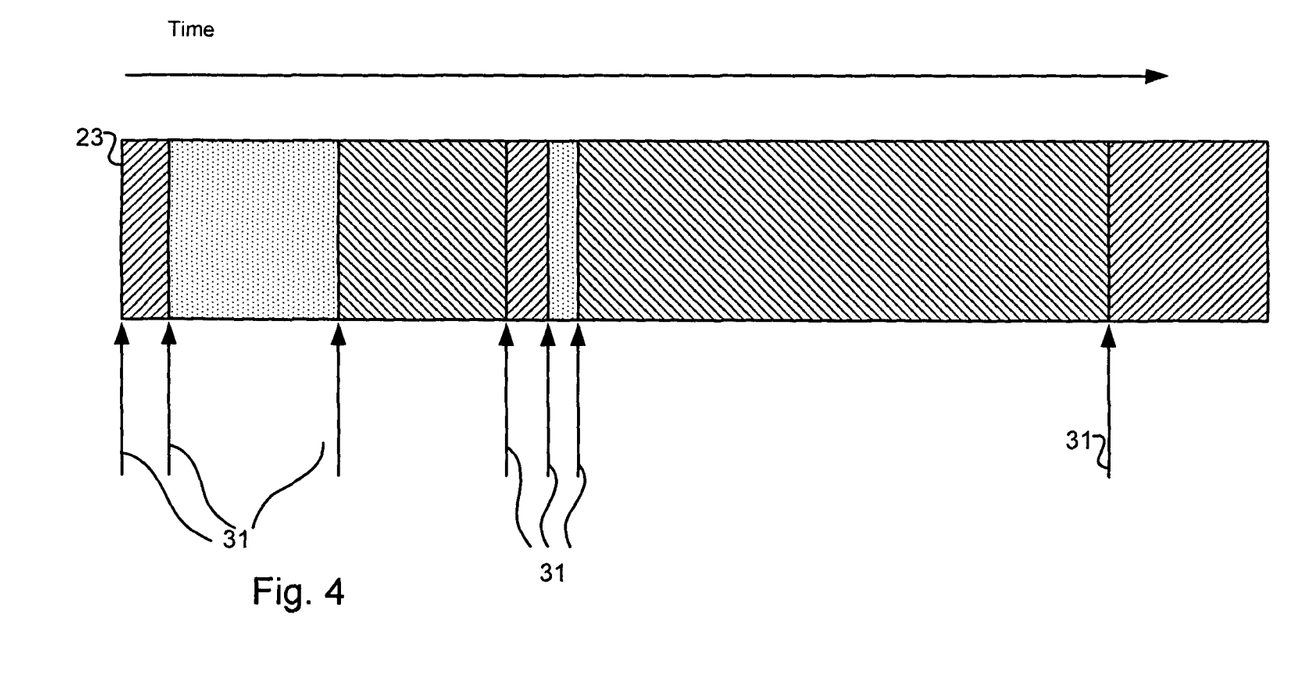
FIG. 4 schematically shows a coded video file which has been processed in the first pass of the video encoding process to identify scene changes.

FIG. 4 schematically shows a coded video file 23 which has been processed in the first pass of the video encoding process to identify scene changes corresponding to the above example configuration file. Segments within the video file 23 which are based on the same scene are shaded. As a result of the first pass of the video encoding process in step s3, the configuration file contains details of where each I-frame is required in the output video file 23. In this embodiment, the configuration file 29 contains a list of frame numbers where a scene transition occurs. For ease of explanation, in this embodiment, only a single I-frame is created for each scene portion.

Figure 5:
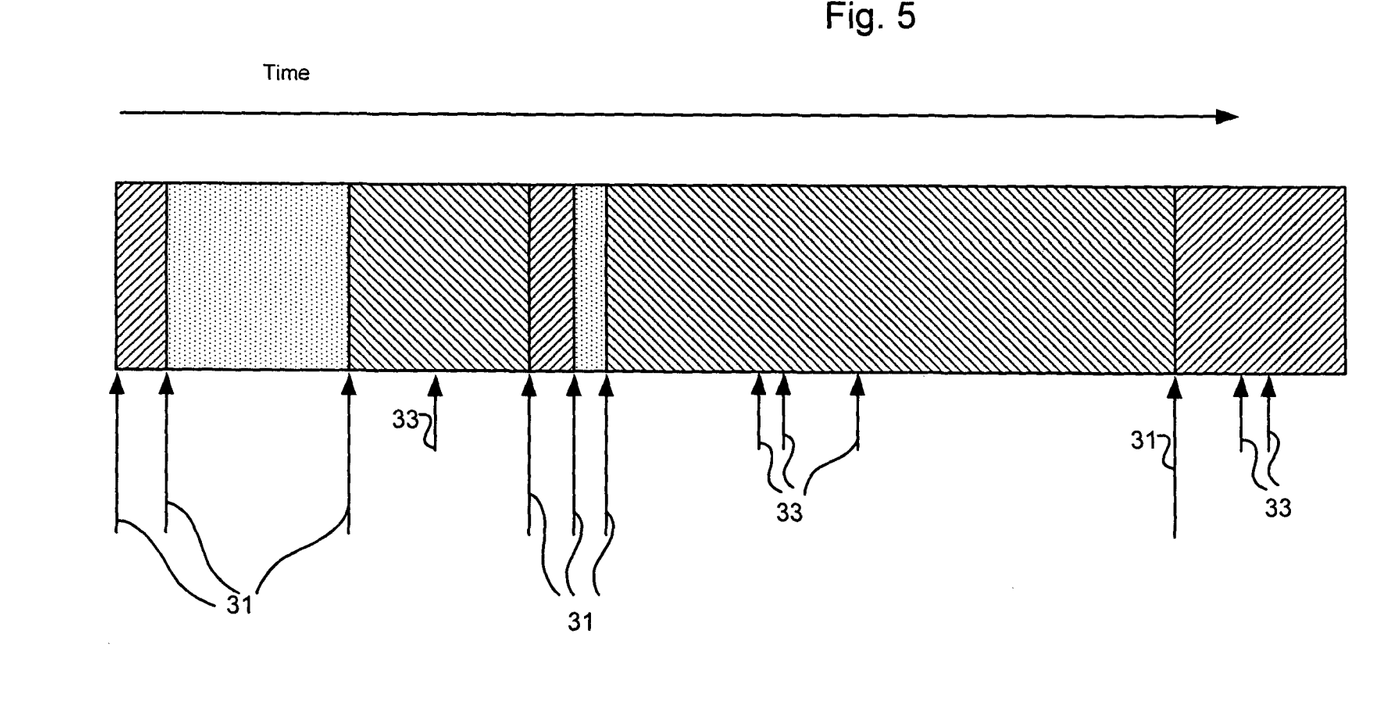
FIG. 5 illustrates the location of the scene change I-frames and the semantic I-frames within the sample video file.

Returning to FIG. 3, after the first pass, in step s5, the video encoder 15 accesses a semantically important processing unit, which in turn accesses a narration data file 27 in order to identify where additional I-frames are required. At step s7, these extra I-frame locations are inserted into the configuration file 29. FIG. 5 illustrates the location of the scene change I-frames 31 and the semantic I-frames 33 within the sample video file.

As shown in FIG. 3, once the configuration file has been updated, at step s9, the video encoder performs a second pass process to generate a compressed video file in a convention manner. Finally at step s11, the video encoder outputs a compressed video file having I-frames 31, 33 at locations indicated by the configuration file 29, with P-frames and B-frames for other frame locations. The output compressed video file 23 is stored in the data store 7.

Figure 6:
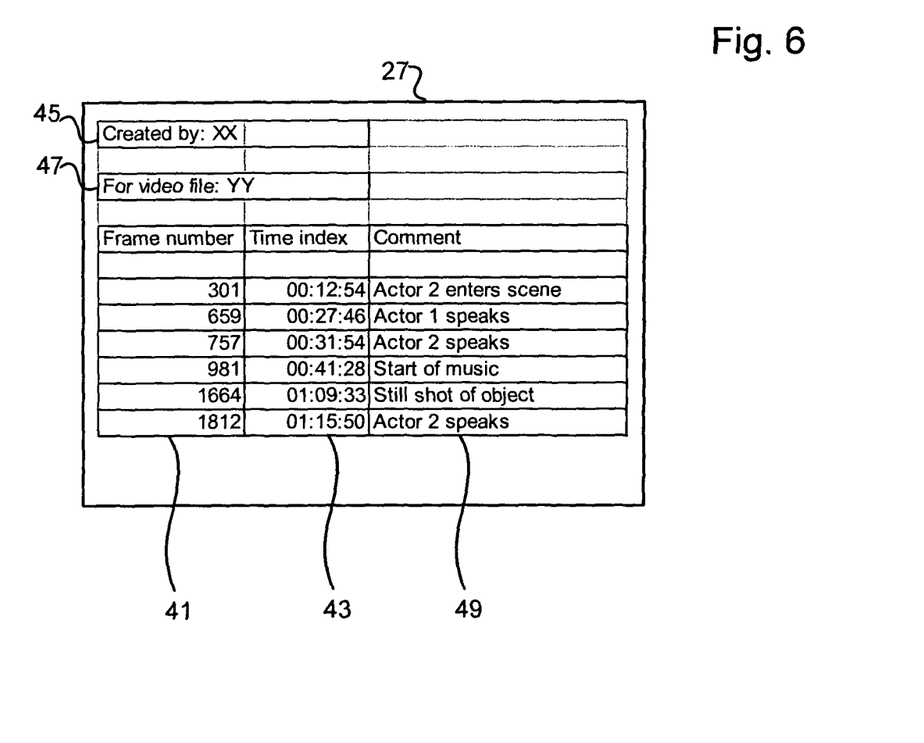
FIG. 6 shows the contents of the narration data file.

The narration data file 27 and the generation of the narration data file 27 will now be explained. FIG. 6 shows the contents of the narration data file 27. The narration data file 27 is very similar to the configuration file 29 generated by the video encoder 15. The narration data file has a creator field 45 for the creator of the file to identify themselves, and title field 47 to identify the video file 21 to which the narration data file 27 relates. Each entry in the narration data file 27 is a frame number 41 and corresponding time stamp 43 indicating where an additional I-frame is to be present in the compressed video file. Additionally, each entry in the narration data file 27 may have an associated comment 49 indicating the significance of the frame.

In this embodiment, the narration data file 27 is generated by the user who produces the uncompressed video input 21. The producer carries out a manual process to mark the start of segments of the video which may be of narrative interest to any end users who view the final video. Examples of narrative interests include: the start of speech by a certain actor, the start of an action sequence, the start of a musical piece etc. The points of narrative interest are not limited to events in the audio track but also include visual events which do not cause a change of scene. For example, a motion freeze, or an actor walking into the scene.

In the first embodiment, a compressed video file corresponding to an input uncompressed video file is generated having additional I-frames at locations where the video producer has manually specified segments of particular interest. In this way, a user who later views the compressed video has the ability to seek to particularly interesting parts of the video.

Second Embodiment

In the first embodiment, the video encoder produces compressed MPEG-2 videos from an input uncompressed video file using a two-pass encoding scheme. In the second embodiment, the video encoder compresses the input video file using a single pass encoding scheme.

Third Embodiment

In the first and second embodiments, the video encoder processed uncompressed video input and produced compressed video data having I-frames placed in accordance with segments of interest as determined by the video producer as well as the conventional placement of I-frames based on scene changes.

In the third embodiment, the system allows I-frames representing points of narrative interest to be added to video files which are already compressed. This is useful in cases where a part of the video only becomes of narrative interest once it has been made available for a length of time.

Figure 7:
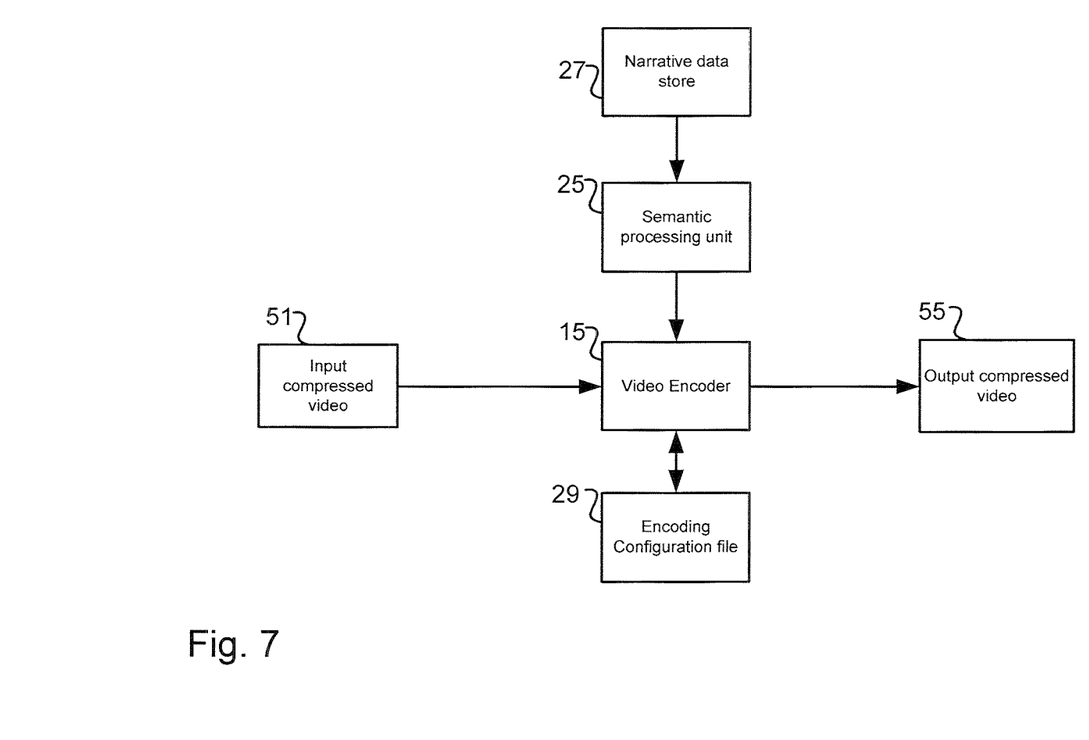
FIG. 7 shows the functional components of the system in the third embodiment.

FIG. 7 shows the functional components of the system in the third embodiment. The physical components are the same as the first embodiment and will not be described again. A compressed video file 51 is processed by the video encoder 15 to produce a new encoded and compressed video file 55. In processing the input video file 51, the video encoder 15 builds a configuration file 29 which specifies the location of existing I-frames. It also receives narration data file 27 information via a semantic processing unit 25. After re-encoding, the new compressed video file 55 contains additional I-frames at locations specified in the narration data file 27 information. In this case, the new video file will be larger than the old compressed video data file because it contains more I-frames.

Fourth Embodiment

In the above embodiments, the video encoder is arranged to produce compressed video files having I-frames located at scene transitions within the video, and also at locations specified in a narration file defined by the producer of the video, or any user who wishes to add I-frames to a video.

In many videos, when a scene change occurs, there will often be a slight time delay between the start of the new segment of the video and the start of any video content which is narratively significant. In later video editing tasks, for example to merge separate videos, or extracts from a single video into a composite video, it is desirable to filter out the narratively unimportant content.

Figure 8:
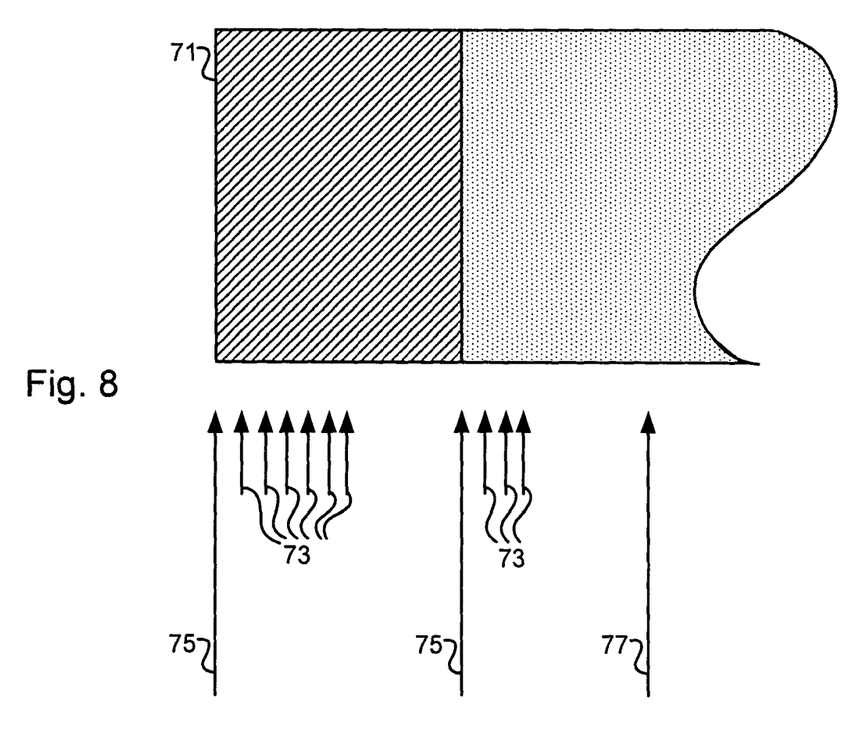
FIG. 8 shows a compressed video file having extra I-frames located after each of the origin I-frames.

In the fourth embodiment, the encoder is further operable to insert additional I-frames after either a scene change I-frame, or a semantic I-frame. FIG. 8 shows a compressed video file 71 having extra I-frames 73 located after each of the original I-frames 75 and narratively important 77 I-frames.

Fifth Embodiment

In the first to fourth embodiments, the encoder is arranged to insert I-frames at specified locations in the video according narratively important video content in a video file as set out in the narration data file 81.

In the fifth embodiment, in addition to inserting I-frames, the video encoder is arranged to emphasize the semantically important sections or an input video by changing the quality of the output video for frames following the inserted I-frame.

The physical and functional components of the encoding system in the fifth embodiment are similar to those of the previous embodiments, the only differences being in the narration data file 81 and the encoder.

Figure 9:
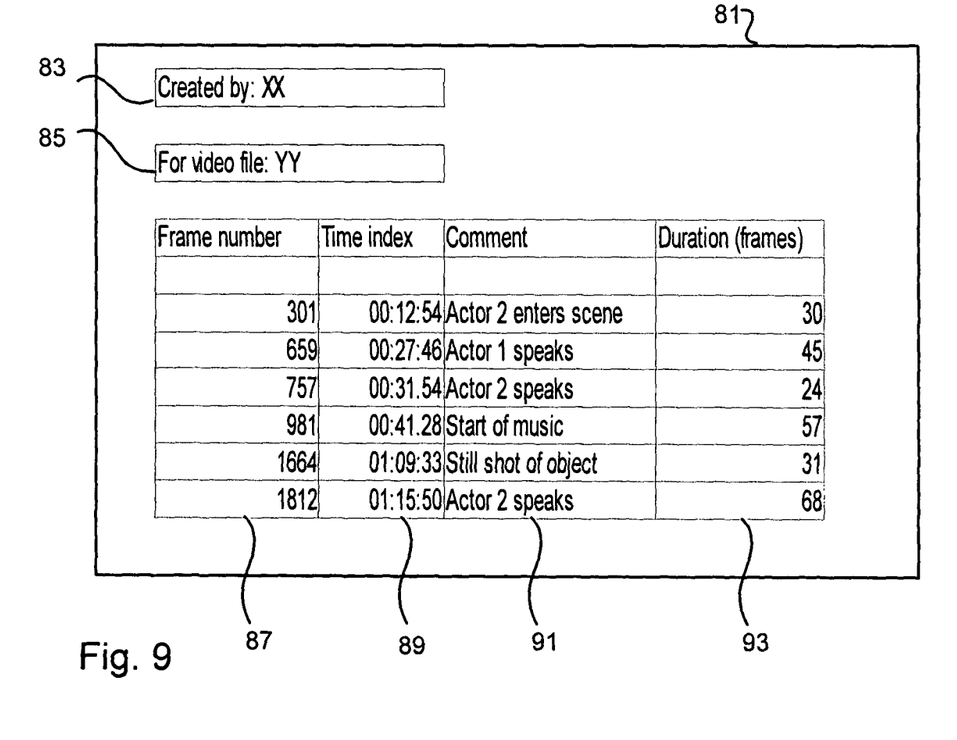
FIG. 9 shows the contents of a narration data file according to the fifth embodiment.

FIG. 9 shows the contents of a narration data file 81 according to the fifth embodiment. The narration file is similar to the narration data file of previous embodiments, it has a field for the creator's name 83, the name of the intended video 85, the frame number 87 and the time index 89 corresponding to that segment of video and a comment 91. The narration data file 83 also includes a duration field 93 information specifying the duration of the narratively significant content, in this case the number of frames spanning the narratively significant event.

The encoder receives information from the narration data file 81 and in response, inserts I-frames and also increases the number of bits allocated to encoding (hereinafter referred to as the bit rate) the sections of the video which are narratively important.

In some cases, the narratively important sections will coincide with sections which the video encoder would normally consider to require more bits. However, in other situations, for example where a particularly important speech is being delivered but the video background is not changing significantly, the video encoder will allocate a higher bit rate to the sections defined in the narration file. If there are restraints on the allowable bit rate for the video of file size, then the video encoder will allocate more bit rate to the narratively important sections and set a lower bit rate for other parts of the video.

Alternatives/Modifications

In the embodiments, the video encoder generated MPEG2 video files. It will appreciated that any compression format performing temporal frame compression could be used. For example, WMV or H.264.

In the first embodiment, the encoder uses a 2-pass encoding scheme. In an alternative, a multi-pass encoding scheme is used. For example a three or four pass encoding scheme.

In the embodiments, the narration file is manually generated by a user of the system. In an alternative, the narration file is generated without user action. An audio processor analyses the audio stream within the video file to determine when speech occurs and populates the narration file.

The invention claimed is:

1. A method of encoding video media content into an encoded video sequence of independent frames and dependent frames, the method comprising:
    analyzing the video media content to determine where scene changes occur within the media content;
    generating encoding parameters for the encoded video sequence, including placement of independent frames corresponding to the location of said scene changes;
    accessing narrative data stored in a narrative data file generated by an author of the video media content, said narrative data indicating narratively significant audio track sections of the media content;
    updating the encoding parameters so that further independent frames are generated at locations indicated by the narrative data; and
    generating the encoded video sequence in accordance with the updated encoding parameters so that the encoded video sequence contains independent frames at locations corresponding to identified scene changes and at locations indicated by the narrative data relating to narratively significant audio track sections.

2. A method according to claim 1, wherein the narrative data is provided by a user.

3. A method according to claim 1, wherein the media content includes uncompressed video data.

4. A method according to claim 1, further comprising updating the encoding parameters to specify that independent frames are added after a scene change has occurred in the media content.

5. A method according to claim 1, further comprising updating the encoding parameters to increase an encoding rate of the media content at sections of the media content which are indicated to be narratively significant.

6. A method according to claim 1, wherein the narrative data includes audio track data indicating the start of a musical piece and the start of speech by a certain actor.

7. A method according to claim 1, wherein the narrative data indicates sections of the media content which are visual events which do not cause a change of scene.

8. A method according to claim 1 wherein the narrative data file contains frame numbers and time stamps indicating where additional independent frames are to be present in the encoded media content.

9. Apparatus for encoding video media content into an encoded video sequence of independent frames and dependent frames; the apparatus comprising:
    a content analyzer for analyzing the visual content of the video media content;

a configuration data store storing the location of scene changes in the video media content;

an encoder for generating independent frames at positions within the encoded video sequence corresponding to identified scene changes; and a narrative data file generated by an author of the media content and indicating narratively significant audio track sections of the media content;

a controller for accessing narrative data stored in said narrative data file;

wherein the configuration data store is updated to include locations of significant audio track sections indicated by the narrative data and the encoder is configured to generate independent frames at positions within the encoded sequence corresponding to the identified scene changes and the significant audio track positions.

10. Apparatus according to claim 9, wherein the narratively significant data is provided by a user.

11. Apparatus according to claim 9, wherein the video media content includes uncompressed video data.

12. Apparatus according to claim 9, wherein the means for updating the configuration data is further operable to specify that independent frames are added after a scene change has occurred in the media content.

13. Apparatus according to claim 9, further comprising updating the configuration data store to increase the encoding rate of the media content at sections of the media content which are indicated to be narratively significant.

14. Apparatus according to claim 9 wherein the narrative data file contains frame numbers and time stamps indicating where additional independent frames are to be present in the encoded media content.

15. Apparatus according to claim 11, wherein the narrative data includes audio track data indicating the start of a musical piece and the start of speech by a certain actor.

16. Apparatus according to claim 11, wherein the narrative data indicates visual events which do not cause a change of scene.

* * * * *